United States Patent [19]

Monahan

[11] Patent Number: 5,149,059

[45] Date of Patent: Sep. 22, 1992

[54] LOW PROFILE MULTIPLE BEARING BLOCK FAIRLEAD

[75] Inventor: J. Kevin Monahan, Delafield, Wis.

[73] Assignee: Harken, Inc., Pewaukee, Wis.

[21] Appl. No.: 691,463

[22] Filed: Apr. 25, 1991

[51] Int. Cl.$^5$ .......................... B66D 3/08; B66D 3/04
[52] U.S. Cl. ...................................... 254/394; 254/415; 254/416
[58] Field of Search ............... 254/390, 394, 404, 413, 254/415, 416, 417; 384/454, 588

[56] References Cited

U.S. PATENT DOCUMENTS

| | | | |
|---|---|---|---|
| 1,210,422 | 1/1917 | Cochran | 384/588 |
| 1,712,478 | 5/1929 | Monroe | 254/394 |
| 1,815,035 | 7/1931 | Cole | 254/415 |
| 1,862,885 | 6/1932 | Davidson et al. | 384/588 |
| 1,865,842 | 7/1932 | Davidson | 384/588 |
| 1,968,321 | 7/1934 | Shope | 254/416 X |
| 2,291,894 | 8/1942 | Gwinn, Jr. | 254/415 |
| 3,172,642 | 3/1965 | Eitel | 254/394 X |
| 3,871,621 | 3/1975 | Jackson | 254/394 X |
| 4,417,718 | 11/1983 | Niskin | 254/415 X |
| 4,479,453 | 10/1984 | Bonassi | 114/218 |
| 4,690,380 | 9/1987 | Niskin et al. | 254/394 |

FOREIGN PATENT DOCUMENTS 991668 10/1951 France ............... 254/394

Primary Examiner—Daniel P. Stodola
Assistant Examiner—Michael R. Mansen
Attorney, Agent, or Firm—Juettner Pyle & Lloyd

[57] ABSTRACT

A low profile fairlead has a plurality of blocks support in a spaced relation along the arc of a circle to simulate a single bearing block of larger diameter.

3 Claims, 1 Drawing Sheet

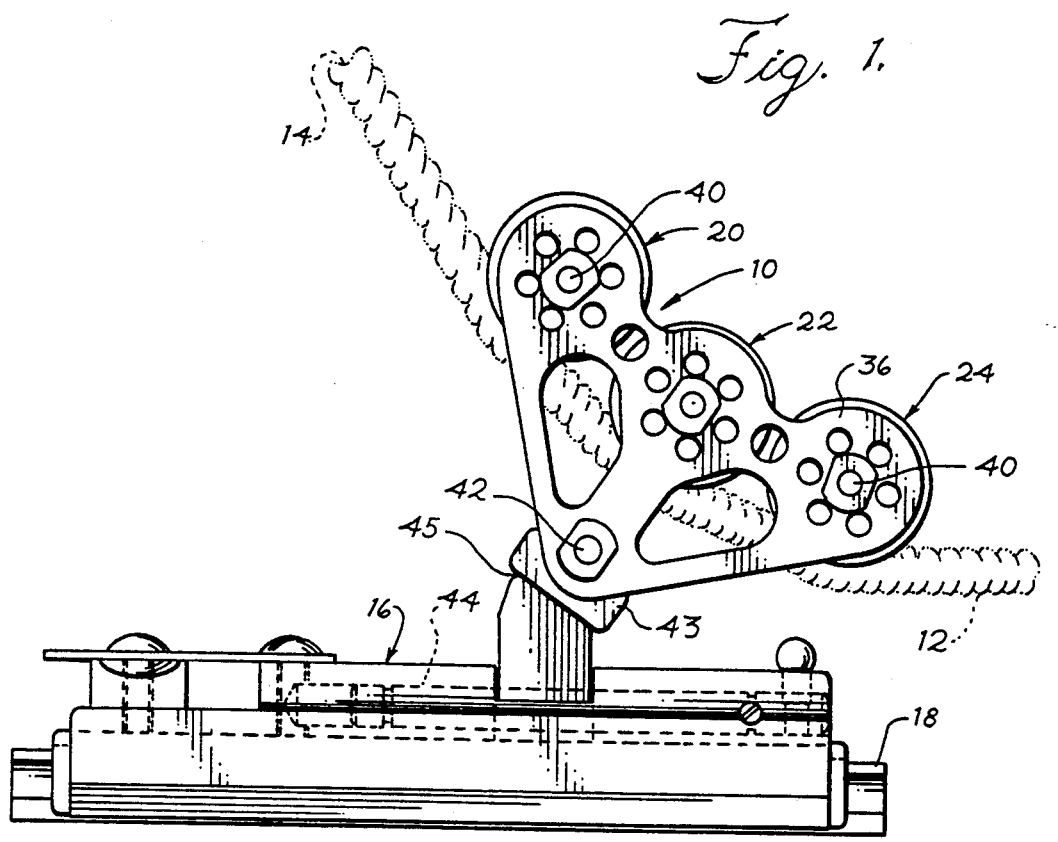
Fig. 1.
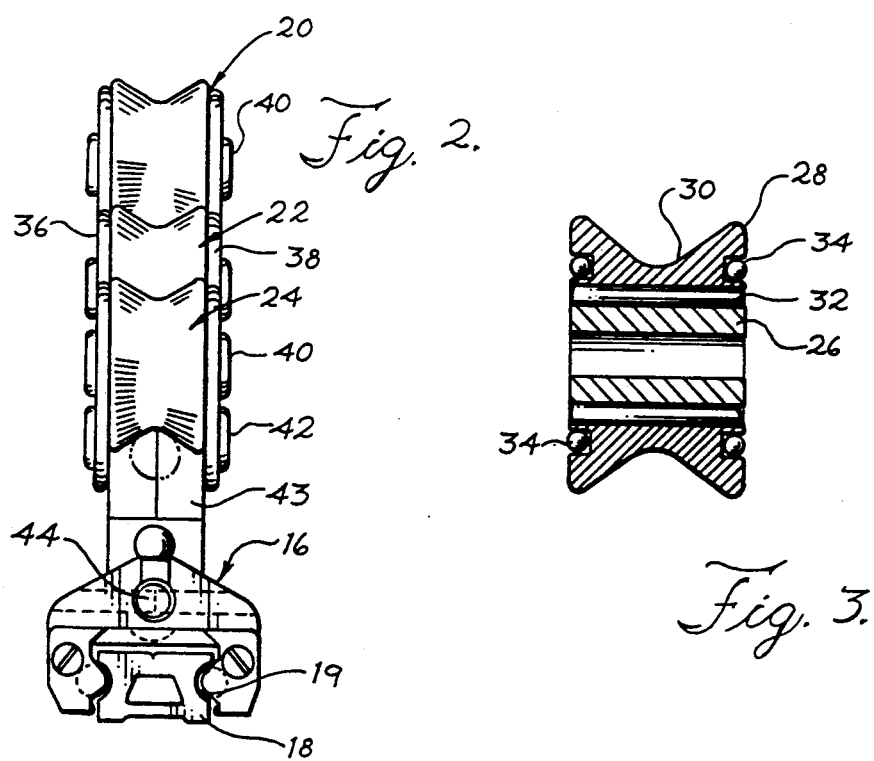
Fig. 2.
Fig. 3.

LOW PROFILE MULTIPLE BEARING BLOCK FAIRLEAD

BACKGROUND OF THE INVENTION

This invention relates to bearing blocks which are particularly suitable for the control of the running rigging of sailing vessels.

Bearing blocks of various types are used on all sailing craft to adjust the said control lines and rigging. In many cases, the control lines are highly loaded and require the use of bearing blocks having a high loading capacity. Typically, a higher load capacity is achieved by increasing the size and weight of the block. Especially in the case of modern racing yachts, there is a desire to keep the fittings as light and small as possible, in order to reduce clutter, windage, and to improve overall performance.

Fairlead blocks, especially those which lead from the genoa or jib, can be subjected to very high loads, and as a result, these blocks are usually heavy and of a large diameter. The blocks may tilt over and cause jamming of the line during tacking. Another problem is that height of the line above the deck is too high, and an additional deflector block must be used to obtain the correct height to enable trimming on a winch drum.

SUMMARY OF THE INVENTION

An object of this invention is to provide a fairlead bearing block system having a low profile and a high strength to weight ratio.

The foregoing objective is accomplished by the use of at least three small bearing blocks, or sheaves of the same diameter connected together in an assembly along a common plane and having axes of rotation located on a common circular arc. The inner races of the sheaves are secured to a pivoting anchor point to allow tilting of assembly to evenly distribute the load received from a line passing over the sheaves. The plurality of small sheaves in effect simulates a single sheave of a much larger diameter and load carrying capacity.

THE DRAWINGS

FIG. 1 is a side view of the bearing block assembly of the present invention.

FIG. 2 is an end view of the assembly shown in FIG. 1.

FIG. 3 is a sectional view taken along the rotary axis of one of the sheaves shown in FIGS. 1 and 2.

DESCRIPTION OF THE PREFERRED EMBODIMENTS

FIGS. 1 and 2 show the block assembly of the present invention, generally indicated at 10. The block assembly as employed in the current embodiment is used as a fairlead, especially as a lead block assembly for the running rigging, such as flexible line 12 having one end 14 connected to the clew of a sail such as a genoa jib (not shown) and the other end leading aft, such as to a winch. In the embodiment shown, the assembly 10 is supported by a car 16 adjustably slidably mounted on a track 18 using sliding rods 19, with the track being secured to the deck of the boat. The car and track arrangement allows for adjustment of the block assembly 10 in various fixed positions in the fore and aft directions.

As shown in FIGS. 1-3, the block assembly comprises three or more sheaves 20, 22 and 24 arranged in a common plane. Each sheave (FIG. 3) comprises a stationary inner race 26, and an outer race 28 rotatably mounted about the inner race and having an outwardly facing groove 30 for receiving the line 12. Bearing means may be provided between the inner and outer races, such as the roller or needle bearings indicated at 32. In addition, side bearing balls 34 may be provided in opposed circular grooves of the outer race 28.

The inner races of the three sheaves 20, 22 and 24 are secured between opposed common side plates 36 and 38 by means of bolts 40 or the like securement means. Preferably, the sheaves are secured in position such that their axes of rotation are parallel and are located on an arc of a circle having a diameter substantially larger than the diameter of the individual sheaves, i.e., in the order of 5-20 to 1. As shown, the circular grooves 30 of the sheaves are arranged in a common longitudinal plane, and the inner or working diameters of the grooves are the same.

In the embodiment shown, the expected average deflection of the line 12 around the sheave assembly relative to the support is in the order of 60 degrees, and the sheaves are arranged to bear the load as uniformly as possible. Thus in the example shown, the diameters of the outer races would be arranged such that each sheave deflects the line about 20 degrees.

The side plates 36 and 38 extend beyond the perimeter of the sheaves 20-24 on both sides of the line 12 and are secured on either side to a pivot post 42 rotatably carried in an upright support 43, which is in turn connected to the car 16 or other suitable support means. The rotary axis of the pivot post 42 is parallel to the rotary axes of the sheaves, and the rotary axis of the post is preferably located on a line between the outer sheaves 20 and 24. In the embodiment shown, the rotary axis of the post 42 is preferably on a common radial line with the axis of the central sheave 22. This allows the sheave assembly to tilt or rock back and forth and more uniformly distribute the load forces from the line 12, with the major line force vectors extending from the post 42 toward the sheaves in a uniform manner.

Also, in the embodiment shown, the base of the upright support 43 is swingably mounted on a longitudinal pin 44 secured to the car 16, such that the support may tilt from side to side around an axis perpendicular to the axis of the post 40. Sideways tilting of the assembly is beneficial to minimize shocks and to prevent binding of the line during tacking of the sail, when tension on the line is released. The upright support may also contain a pivot 45 in an intermediate portion thereof.

Unlike a conventional circular bearing block which is loaded in a limited arc by the line, while the remaining parts are relatively unloaded, the block assembly of the present invention is contained substantially in the zone of high loading, which enables a much lower mounting profile and savings of weight in comparison with conventional single fairlead blocks.

It will be apparent that four or more sheaves may be employed instead of the three as shown. Also, the diameters of the outer races may be different, as long as the tangents along the outer races define a curve, preferably that of a circle. In the normal case, however, the sheaves will be arranged on an angle relative to each other such that they bear the load equally for a particular angle of line deflection, and therefore, sheaves of equal diameter will normally be preferred.

I claim:

1. A fairlead multiple bearing block assembly for supporting a flexible line, said assembly comprising at least three adjacent sheaves, each sheave comprising an inner race and an outer line receiving race rotatable about the inner race, said sheaves being arranged in a common plane to receive the line and having parallel axes of rotation intersecting a common arc having a diameter larger than the diameter of the sheaves, side plate means for connecting the inner races of said sheaves in a fixed relation to form said assembly, and an upright fitting outside of said arc for securing said sheave assembly to a base support, said fitting comprising an arm, first pivot means between said side plate means and said arm to enable pivoting of the sheave assembly about a first axis parallel to the axes of rotation of the sheaves, second pivot means between said arm and the side plate means to enable pivoting of the sheave assembly around a second axis perpendicular to and intersecting said first axis, and third pivot means between said base and said arm in the plane of the sheave assembly to enable said assembly to swing laterally.

2. The assembly of claim 1 wherein said sheave assembly comprises a centrally located sheave, and wherein said second axis is perpendicular to the axis of rotation of said sheave.

3. The assembly of claim 1 additionally comprising a track secured to said support, and a car slidably mounted on said track, said car and said arm being connected by said third pivot means.